(12) United States Patent
Wei et al.

(10) Patent No.: US 11,143,091 B2
(45) Date of Patent: Oct. 12, 2021

(54) EFFICIENT ENGINE COMBUSTION SYSTEM WITH MULTIPLE COMBUSTION MODES

(71) Applicant: TIANJIN UNIVERSITY, Tianjin (CN)

(72) Inventors: Haiqiao Wei, Tianjin (CN); Jianxiong Hua, Tianjin (CN); Dengquan Feng, Tianjin (CN); Lei Zhou, Tianjin (CN); Kai Dong, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 16/967,037

(22) PCT Filed: Mar. 29, 2019

(86) PCT No.: PCT/CN2019/080653
§ 371 (c)(1),
(2) Date: Aug. 3, 2020

(87) PCT Pub. No.: WO2020/057098
PCT Pub. Date: Mar. 26, 2020

(65) Prior Publication Data
US 2021/0040879 A1    Feb. 11, 2021

(30) Foreign Application Priority Data
Sep. 20, 2018 (CN) .......................... 201811101106.5

(51) Int. Cl.
*F02B 19/00* (2006.01)
*F02B 19/10* (2006.01)
(Continued)

(52) U.S. Cl.
CPC .............. *F02B 19/108* (2013.01); *F01L 9/10* (2021.01); *F02D 13/0203* (2013.01); *F02F 1/242* (2013.01)

(58) Field of Classification Search
CPC .. F02B 19/10; F02B 19/1009; F02B 19/1023; F02B 19/108; F02B 19/1085;
(Continued)

(56) References Cited

U.S. PATENT DOCUMENTS 2,072,437 A * 3/1937 Wurtele ................. F02M 57/02
123/90.12
5,115,775 A * 5/1992 Gruenwald ............. F02B 19/02
123/292

(Continued)

FOREIGN PATENT DOCUMENTS

| CN | 201159093 | 12/2008 |
|----|-----------|---------|
| CN | 202194869 | 4/2012 |

(Continued)

OTHER PUBLICATIONS

International Search Report and the Written Opinion of the International Searching Authority corresponding to International Patent Application No. PCT/CN2019/080653 (10 pages) (dated Jun. 3, 2019) (with translation of search).

*Primary Examiner* — John Kwon
(74) *Attorney, Agent, or Firm* — Myers Bigel, P.A.

(57) ABSTRACT

An efficient engine combustion system with multiple combustion modes, includes a valve actuating mechanism, a pre-combustion chamber, and a main combustion chamber. The valve actuating mechanism is a fully variable valve mechanism; an intake valve and an exhaust valve are driven by high-pressure oil; ignition is implemented by means of an ignition apparatus of the pre-combustion chamber; and a spark plug and a single-hole fuel injector are mounted in the pre-combustion chamber, a bottom end of which is provided with a flame jet hole. The continuous variable of valve (Continued)

timing and real-time adjustment of valve lift are realized by the control of a three-position four-way servo valve, driven by the high-pressure oil and monitored by a displacement sensor. The efficient engine combustion system with multiple combustion modes employs different combustion modes under different engine conditions, so as to ensure optimal thermal efficiency under different operating condition regions.

7 Claims, 4 Drawing Sheets

(51) Int. Cl.
*F01L 9/10* (2021.01)
*F02D 13/02* (2006.01)
*F02F 1/24* (2006.01)

(58) Field of Classification Search
CPC .. F02B 19/08; F02B 19/1004; F02B 19/1014; F02B 19/1019; F02B 19/1028; F02P 5/00; F02P 5/005; F02P 5/04; F02P 5/045; F02N 19/00; F02D 41/062; F02D 41/064; F02D 41/068
See application file for complete search history.

(56) References Cited

U.S. PATENT DOCUMENTS

| | | | |
|---|---|---|---|
| 2006/0021587 A1* | 2/2006 | Robel | F02D 41/0027 123/26 |
| 2007/0000472 A1* | 1/2007 | Gong | F01N 13/009 123/274 |
| 2007/0162216 A1* | 7/2007 | Choi | F02D 35/023 701/103 |
| 2017/0122184 A1* | 5/2017 | Hampson | F02D 37/02 |
| 2018/0135505 A1 | 5/2018 | Fuchs | |

FOREIGN PATENT DOCUMENTS

| | | |
|---|---|---|
| CN | 107587930 | 1/2018 |
| CN | 207377616 | 5/2018 |
| CN | 108291475 | 7/2018 |
| CN | 109098834 | 12/2018 |

* cited by examiner

EFFICIENT ENGINE COMBUSTION SYSTEM WITH MULTIPLE COMBUSTION MODES

CROSS-REFERENCE TO RELATED APPLICATIONS

The present application is a 35 U.S.C. § 371 national stage application of PCT International Application No. PCT/CN2019/080653, filed on Mar. 29, 2019, which claims the benefit of Chinese patent application No. 201811101106.5, filed on Sep. 20, 2018, the contents of which are incorporated by reference herein in their entireties.

TECHNICAL FIELD

The disclosure relates to the technical field of internal combustion engines, in particular to an engine combustion system with multiple combustion modes based on a fully variable valve system and a pre-combustion chamber structure, which can realize optimal combustion of an engine under different loads.

BACKGROUND ART

With the increasingly stringent fuel consumption regulations promulgated in the world, the research and development of automotive engines are facing increasing challenges. Due to the limitations of flame propagation rate and detonation phenomena, and the like, the potential of conventional Spark Ignition (SI) engines in reducing $CO_2$ has been largely driven to an extreme. In the future, the development direction of reducing $CO_2$ emission from engine will mainly focus on the new highly efficient combustion technology.

Homogeneous Charge Compression Ignition (HCCI) combustion mode is a clean and efficient combustion mode that has been widely concerned at present. Its combustion heat release is concentrated, and the lean mixture in the cylinder is auto-ignited at multiple ignition points with high thermal efficiency. Unfortunately, the ignition of this combustion mode is largely influenced by chemical kinetics and there lacks a means of directly controlling the combustion process. In addition, the working load of HCCI combustion is also greatly limited, and it is difficult to avoid rough combustion while ensuring stable ignition under medium and high load conditions. Therefore, many researchers have proposed to apply both HCCI and SI combustion modes to one engine at the same time, using HCCI combustion mode at low load, and switching to SI combustion mode at medium-high mode. However, the control parameters of the two combustion modes are quite different, and it is difficult to guarantee the smoothness of the engine operation during the switching process.

One solution to the problem of smooth switching between HCCI and SI is to achieve auto-ignition of unburned gases in the cylinder via spark-assisted ignition, i.e., spark-assisted compression ignition (SACI) combustion, when the engine operating load exceeds the maximum HCCI load. However, spark ignition has a strict restriction on an equivalence ratio of the mixture, so the effect of spark assistance in a lean combustion state will be greatly compromised, while homogeneous equivalence combustion is difficult to show the advantage of high thermal efficiency for HCCI.

How to apply the attractive compression ignition combustion mode to the traditional ignition engine and show excellent energy-saving and emission-reducing effects under working conditions of different load requirements has become a major problem in the current design, research and development of internal combustion engines.

SUMMARY

The present disclosure aims to overcome the deficiencies of the prior art and to provide an efficient engine combustion system with multiple combustion modes in which a valve actuating mechanism is a fully variable valve mechanism, the fully variable valves providing different degrees of negative valve overlap (NVO) to achieve different combustion modes including HCCI, SACI and SI. And the function of the pre-combustion chamber can always ensure that an ignition of a spark plug and propagation of an initial flame kernel are performed approximately at stoichiometric ratio. Therefore, a lean-burn process in the main combustion chamber and an equivalent combustion process in pre-combustion chamber can be implemented. In addition, when a thermodynamic state in the cylinder is not enough to realize HCCI, secondary heating and pressurization on the unburned mixed gas in the main combustion chamber can be performed by accelerating the flame through the jet hole of the pre-combustion chamber, which in turn induces spontaneous combustion of the unburned gas, and thus the SACI combustion mode can be realized more stably. Even if the combustion is completely SI combustion, the acceleration of the flame by the jet holes can obviously reduce the fuel consumption.

The purpose of the present disclosure is achieved by the following technical solutions.

An efficient engine combustion system with multiple combustion modes comprises a valve actuating mechanism, a pre-combustion chamber and a main combustion chamber arranged in an engine, wherein two injectors are mounted on a cylinder head of the engine, one of the injectors is mounted in the pre-combustion chamber to provide mixed gas of equivalent ratio for the pre-combustion chamber, and the other injector is selectively mounted in the main combustion chamber or on an intake port according to different engine structures, to provide required mixed gas for the main combustion chamber, the valve actuating mechanism is a fully variable valve mechanism, and an intake valve and an exhaust valve of the valve actuating mechanism are driven by high-pressure hydraulic oil, so that continuous variable of valve timing and real-time adjustment of valve lift in a range of 0-10 mm can be realized; and ignition is realized through an ignition apparatus of the pre-combustion chamber, and a spark plug and a single-hole fuel injector are installed in the pre-combustion chamber, and a flame jet hole is arranged in a bottom end of the pre-combustion chamber.

For start-up, idle and low load operating conditions, a conventional equivalent SI combustion mode is employed, the single-hole fuel injector in the pre-combustion chamber does not inject fuel; when the engine operates at partial load, the engine operates in a lean-burn SACI combustion mode, the single-hole fuel injector in the pre-combustion chamber injects fuel during an upward movement of a piston to realize stoichiometric combustion in the pre-combustion chamber; when the engine operates under a condition of medium or high load, a lean-burn SI mode is employed, the single-hole fuel injector in the pre-combustion chamber injects a certain amount of fuel during the upward movement of the piston; when the engine operates under a condition of full load, the equivalent SI mode is employed, the single-hole fuel injector in the pre-combustion chamber does not inject fuel.

The valve actuating mechanism comprises an intake valve and an exhaust valve which are arranged on the cylinder head of the engine, wherein the intake valve and the exhaust valve are respectively connected with an intake port and an exhaust port, and an intake valve spring and an exhaust valve spring are respectively arranged on the intake valve and the exhaust valve, and each of the intake valve spring and the exhaust valve spring is connected with a hydraulic piston with an ejector rod, and the opening and closing of the intake valve and the exhaust valve are performed by the hydraulic pistons, and the hydraulic piston is arranged in each of two hydraulic cylinders, and a displacement sensor is arranged on the hydraulic cylinder and used for measuring valve lift, and an upper oil inlet pipe and a lower oil inlet pipe are both arranged on the hydraulic cylinder, and a one-way throttle valve is arranged on each of the upper oil inlet pipe and the lower oil inlet pipe, so that hydraulic oil can be throttled in a forward direction and normally communicated in a reverse direction in pipes of the upper oil inlet pipe and the lower oil inlet pipe; and the one-way throttle valve is connected with two holes of a three-position four-way servo valve, and the other two holes of the three-position four-way servo valve are respectively connected with a high-pressure liquid source and a low-pressure liquid source through pipes.

Further, a pressure of the high-pressure liquid source is in the range of 0-7 MPa, and a pressure of the low-pressure liquid source is 1 bar.

Further, the spark plug and the single-hole fuel injector are both arranged in the pre-combustion chamber housing, and an electrode of the spark plug, a bottom end of the single-hole injector and an internal cavity in the pre-combustion chamber housing form the pre-combustion chamber; and the pre-combustion chamber housing is installed on the engine cylinder head by threads.

Furthermore, an injection hole of the single-hole fuel injector is obliquely arranged so as to reduce wall impingement of a fuel spray injected in the pre-combustion chamber.

Further, the pre-combustion chamber is communicated with the main combustion chamber through jet holes, and the number of the jet holes is 6-8, and an aperture of the jet holes is 1 mm-2 mm; and the jet holes enable flame to be jetted from the pre-combustion chamber to the main combustion chamber so as to improve the combustion rate in the main combustion chamber.

Compared with the combustion mode of the existing ignition engine, the high-efficiency engine combustion system with multiple combustion modes provided in the disclosure has the following specific implementation aiming at different working conditions of the engine:

1) under the start-up, idle and low load working conditions of engine due to the fact that a throttle valve apparatus is cancelled, a small intake valve lift and exhaust valve lift need to be controlled through a fully variable valve mechanism so that the required air inlet amount is achieved, and stable SI combustion is achieved; 2) when the engine works at partial load, the lifts of the intake and exhaust valves are gradually increased, and with an appropriate negative valve overlap, exhaust gas can be trapped in the cylinder so as to realize the SACI combustion mode; 3) when the load of the engine is a medium-high load, under the control of the fully variable valve mechanism, the negative valve overlap is gradually reduced until a common SI valve lift is reached, and at the moment the engine works in the SI lean-burn state, so that the combustion stability is guaranteed, and the high thermal efficiency is achieved; 4) when the engine works under the full-load working condition, the fuel quantity is gradually increased, and the combustion mode is SI equivalent combustion.

Compared with the prior art, the technical solution of the disclosure has the following beneficial effects:

1. the existence of the pre-combustion chamber ensures the stability of spark ignition and initial flame propagation, and when the flame in the pre-combustion chamber passes through the jet holes, a remarkable flame acceleration phenomenon can be generated, so that the combustion rate in the main combustion chamber is increased, and the fuel consumption of the engine can be obviously reduced, and the thermal efficiency is improved.

2. the combustion system provided in the disclosure can realize smooth transition between different combustion modes, rather than direct switching; and ensure as much as possible that the engine has the optimal thermal efficiency in different working condition regions.

Reference numerals: 1-piston, 2-intake valve, 3-intake port, 4-intake valve spring, 5-lower oil inlet pipe, 6-hydraulic piston, 7-upper oil inlet pipe, 8-hydraulic cylinder, 9-displacement sensor, 10-one-way throttle valve, 11-one-way throttle valve, 12-three-position four-way servo valve, 13-high pressure oil pipe, 14-low pressure oil pipe, 15-pre-combustion chamber housing, 16 three-position four-way servo valve, 17-displacement sensor, 18-one-way throttle valve, 19-hydraulic cylinder, 20-one-way throttle valve, 21-hydraulic piston, 22-exhaust valve spring, 23-exhaust port, 24-spark plug, 25-single-hole fuel injector, 26-exhaust valve, 27-thread, 28-injection hole, 29-fuel spray, 30-pre-combustion chamber, and 31-jet hole

DETAILED DESCRIPTION OF THE EMBODIMENTS

The disclosure will now be further described with reference to the accompanying drawings.

The disclosure discloses an efficient engine combustion system with multiple combustion modes, which combines a fully variable valve mechanism and a pre-combustion chamber jet ignition apparatus, and further adopts different combustion modes according to different loads so as to achieve optimal combustion under various loads. The detailed description includes implementations of a fully variable valve mechanism, a pre-combustion chamber jet ignition apparatus, and a controlling method for multi-combustion modes, and is further described below with reference to the accompanying drawings.

Embodiment of a Fully Variable Valve Mechanism

Figure 1:
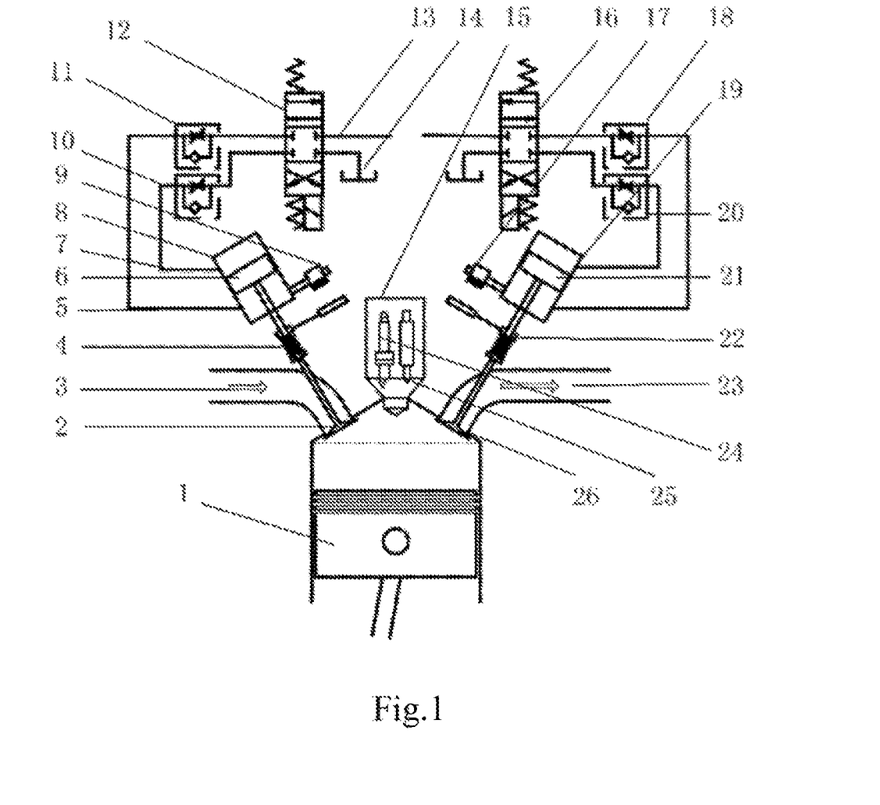
FIG. 1 is a schematic view showing the structure of the present disclosure.

As shown in FIG. 1, an intake valve 2 and an exhaust valve 26 are installed on a cylinder head, and the intake valve 2 and the exhaust valve 26 are respectively connected with an intake port 3 and an exhaust port 23, and the intake valve 2 and the exhaust valve 26 are respectively installed with an intake valve spring 4 and an exhaust valve spring 22, and the opening and closing of the intake valve 2 and the exhaust valve 26 are performed by hydraulic pistons 6 and 21 with ejector rods, and the hydraulic pistons 6 and 21 are respectively installed in hydraulic cylinders 8 and 19, and the hydraulic cylinders 8 and 19 are respectively provided with displacement sensors 9 and 17 for measuring a valve lift. The hydraulic cylinder 8 is connected with an upper oil inlet pipe 7 and a lower oil inlet pipe 5, and the upper oil inlet pipe 7 and the lower oil inlet pipe 5 are respectively provided with one-way throttle valves 10 and 11, so that hydraulic oil is throttled in the forward direction and normally communicated in the reverse direction in the upper oil inlet pipe 7 and the lower oil inlet pipe 5. The one-way throttle valves 10 and 11 are respectively connected with two holes of a three-position four-way servo valve 12, and the other two holes of the three-position four-way servo valve are respectively connected with a high-pressure oil pipe 13 and a low-pressure oil pipe 14. The high-pressure oil pipe 13 and the low-pressure oil pipe 14 are respectively connected with a high-pressure liquid source and a low-pressure liquid source.

Similarly, the hydraulic cylinder 19 is connected with an upper oil inlet pipe and a lower oil inlet pipe, wherein the upper oil inlet pipe and the lower oil inlet pipe are respectively provided with one-way throttle valves 20 and 18, and the one-way throttle valves 20 and 18 are respectively connected with two holes of a three-position four-way servo valve 16, and the other two holes of the three-position four-way servo valve 16 are respectively connected with a high-pressure liquid source and a low-pressure liquid source through a high-pressure oil pipe and a low-pressure oil pipe. The high-pressure liquid source is provided by a high-pressure oil pump, wherein a pressure of the high-pressure liquid source is adjustable within the range of 0-7 MPa, and the high-pressure liquid source is mainly used for driving the opening and closing of the valves. The low-pressure liquid source comes from a tank and a pressure of the low-pressure liquid source is 1 bar.

For the sake of simplicity, the following will only take the hydraulic cylinder 8 on one side of the fully variable valve mechanism as an example to describe the main operation principle thereof: 1) when the intake valve needs to be opened, the three-position four-way servo valve 12 receives a control signal and acts, so that the upper oil inlet pipe 7 is communicated with a high-pressure liquid source, and the lower oil inlet pipe 5 is communicated with a low-pressure liquid source, and the hydraulic piston 6 is pushed under the action of high-pressure oil, enabling the valve to be opened against the elastic force of a spring, and the higher the pressure of the high-pressure liquid source is, the faster the opening speed is. And 2) when the intake valve 2 reaches a required lift and needs to be maintained at an open state, under the control of the three-position four-way servo valve 12, the upper oil inlet pipe 7 and the lower oil inlet pipe 5 are both disconnected from the high-pressure liquid source and the low-pressure liquid source, so that the oil pressure in the hydraulic cylinder is unchanged to maintain the valve lift. And 3) when the intake valve needs to be closed, under the control of the three-position four-way servo valve 12, the lower oil inlet pipe 5 is communicated with a high-pressure liquid source, and the upper oil inlet pipe 7 is communicated with a low-pressure liquid source, and the hydraulic pressure pushes the hydraulic piston 6 to move upwards, and the intake valve 2 is closed under the action of the hydraulic pressure and the elastic force of the intake valve spring 4. To avoid excessive impact at a moment when the valve is closed, the opening degree of the one-way throttle valve 11 should be smaller than the opening degree of the one-way throttle valve 10. The displacement sensor 9 can measure and monitor the opening and closing timing of the intake valve and the valve lift in real-time, and feed them back to an electronic control unit. Similarly, the process of opening, maintaining and closing the exhaust valve is the same as that of the intake valve, mainly controlled by the three-position four-way servo valve 16, and performed by the hydraulic piston 21, the hydraulic cylinder 19 and the one-way throttle valves 18 and 20.

Embodiment of the Jet Ignition Apparatus of the Pre-Combustion Chamber

Figure 2:
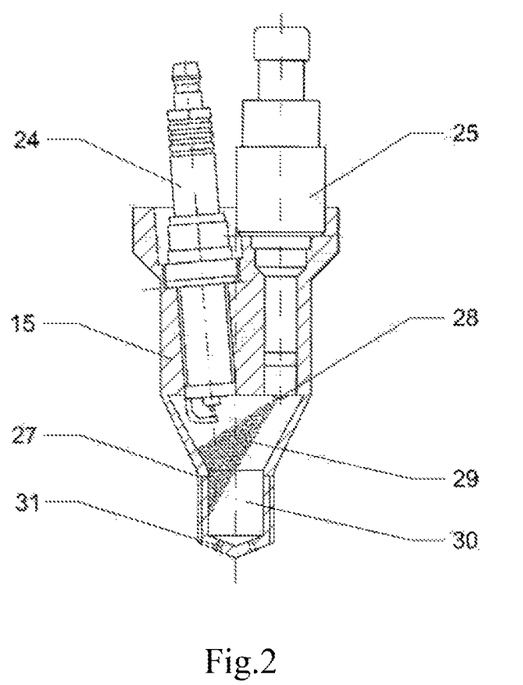
FIG. 2 is a cross-sectional view of an ignition apparatus in the pre-combustion chamber.

As shown in FIG. 2, a spark plug 24 and a single-hole fuel injector 25 are mounted on the pre-combustion chamber housing 15, at the bottom end of which a flame jet hole 31 is provided, and the pre-combustion chamber housing 15 is mounted on the engine cylinder head by means of a thread 27. The electrode of the spark plug, the bottom end of the single-hole fuel injector 25 and the cavity in the pre-combustion chamber housing form a pre-combustion chamber 30, wherein the pre-combustion chamber is communicated with the main combustion chamber through the jet hole 31, and the number of the jet holes is 6-8, and the aperture of the jet holes is 1 mm-2 mm. The jet hole 31 enables a jet flame ejected from the pre-combustion chamber to the main combustion chamber to increase a combustion rate in the main combustion chamber. In addition, the single-hole fuel injector 25 installed in the pre-combustion chamber housing 15 is a small-flow single-hole fuel injector, and the injection hole 28 thereof are obliquely arranged so as to minimize wall impingement of an fuel spray 29 injected in the pre-combustion chamber.

In addition to the single-hole fuel injector 25 installed in the pre-combustion chamber, another main injector having a larger flow rate is installed in the main combustion chamber or on the intake port to provide a required mixed gas for the main combustion chamber. Because the pre-combustion chamber and the main combustion chamber both have injector, the mixed gas in the engine can be flexibly controlled in practical work, and even when the main combustion chamber is in lean-burn, the mixed gas in the pre-combustion chamber can be ensured to be an equivalent mixed gas so as to ensure the stability of ignition and initial flame propagation.

The existence of the pre-combustion chamber ensures the stability of spark ignition and initial flame propagation, and when the flame in the pre-combustion chamber passes through the jet hole, a remarkable flame acceleration phenomenon can be generated, so that the combustion rate in the main combustion chamber is increased, and the fuel consumption of the engine can be obviously reduced, and the thermal efficiency is improved.

Figure 3:
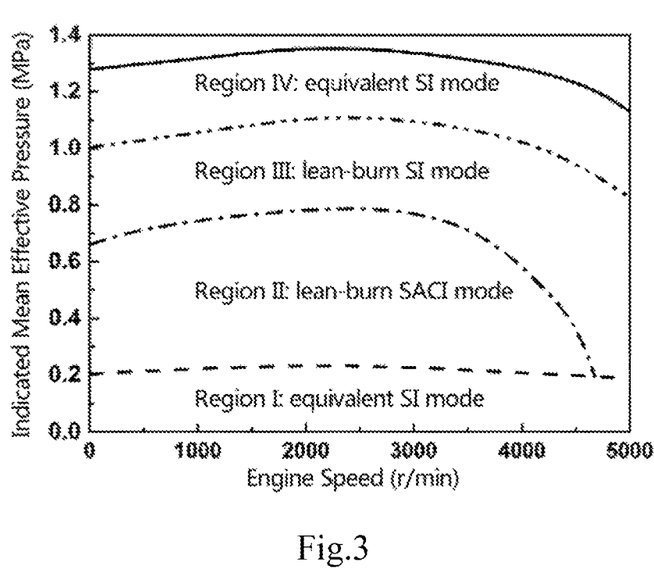
FIG. 3 is a diagram showing control of combustion modes under different operating conditions.

The combustion modes of the disclosure under different operating conditions are shown in FIG. 3, wherein the engine adopts different combustion modes under different operating conditions so as to achieve high thermal efficiency as much as possible.

Figure 4:
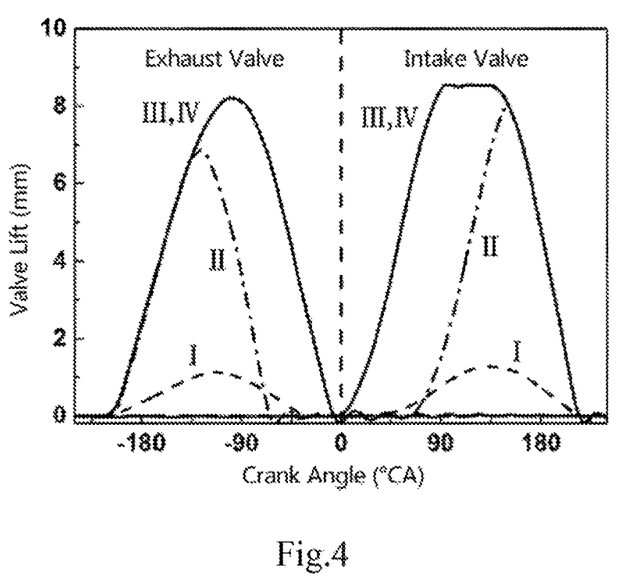
FIG. 4 is a graph of valve lift curves required for different combustion modes.
Figure 5:
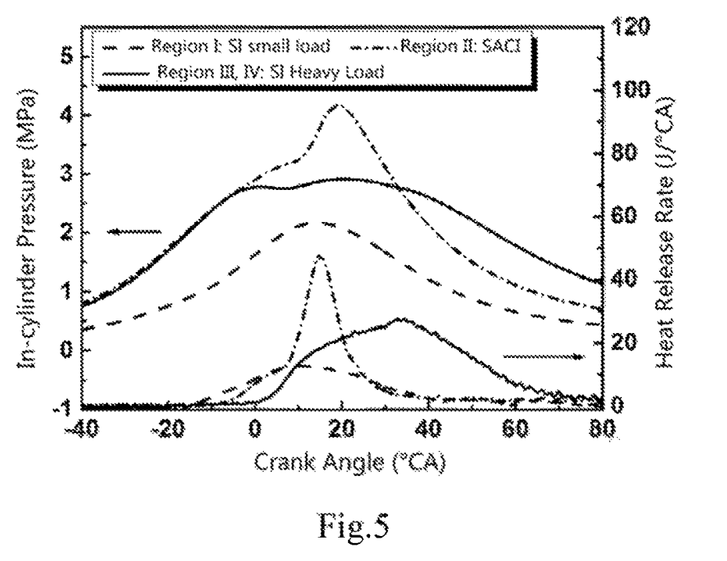
FIG. 5 is a graph of in-cylinder pressure for different combustion modes.

1) For start-up, idle and low load operating conditions (region I in FIG. 3), a conventional equivalent SI combustion mode is employed in this region to ensure combustion stability. Since the throttle valve is cancelled, this condition requires a small valve lift to control a total amount of gas entering the cylinder, and in this case, the valve lift is shown as I in FIG. 4. Because the fuel-air mixture concentration in the combustion process is approximately a stoichiometric ratio at the time, the single-hole fuel injector in the pre-combustion chamber does not inject fuel. On this occasion, the combustion pressure in the cylinder is shown as a dotted line in FIG. 5, and the combustion pressure is similar to the combustion pressure of the conventional gasoline engine under the condition of a small load, and the difference lies in that the presence of the jet ignition apparatus makes the combustion rate higher than that of the conventional gasoline engine under a small load.

2) When the engine is operating at partial load (region II in FIG. 3), the engine is operating in a lean-burn SACI combustion mode, resulting in higher thermal efficiency. In this mode, the valve lift is shown as II in FIG. 4, with a certain degree of negative valve overlap, and a part of hot burned gas can be trapped in the cylinder, so that the in-cylinder mixed as has a higher thermodynamic state. In the combustion mode, the gas in the pre-combustion chamber is a homogeneous gas, wherein the gas in the main combustion chamber is rarefied gas, and the single-hole fuel injector 25 in the pre-combustion chamber injects fuel during the upward movement of the piston 1 to realize stoichiometric combustion in the pre-combustion chamber. When the flame is accelerated and emitted from the jet hole of the pre-combustion chamber, the mixed gas in the main combustion chamber is subjected to spontaneous combustion in a high initial thermodynamic state under the heating and pressurizing action of the jet flame, namely a CI combustion stage in the SACI mode. Although there is spontaneous combustion, due to the low load in this condition and a dilution effect of $CO_2$, a severe pressure oscillation in the cylinder, which would occur in knocking combustion, does not arise. The case of in-cylinder combustion pressure in this combustion mode is described by dash-dotted lines in FIG. 5, and it is apparent that there are two distinct stages of heat release rate, the SI stage and the CI stage, respectively. And in this region, as the load increases, the negative valve overlap becomes smaller so that the SI ratio increases and the CI ratio decreases.

3) When the engine operates under the conditions of medium-high load and full load (regions III and IV in FIG. 3), the negative valve overlap is almost zero and the engine operates in the full SI combustion mode again. The difference between region III and region IV is that the engine adopts the lean-burn SI mode in region III and the equivalent SI mode in region IV, so that the thermal efficiency of the engine can be improved as much as possible on the premise of ensuring power output. It should be noted that whether lean-burn in region III or equivalent-burn in region IV, the variation of the equivalence ratio is only for the main combustion chamber. However, the equivalence ratio of the pre-combustion chamber is always maintained approximately the stoichiometric ratio to ensure a stable and reliable ignition process and formation of an initial flame kernel. That is, the injector in the pre-combustion chamber injects a certain amount of fuel during the upward movement of the piston in the lean-burn SI mode of region III, and the injector in the pre-combustion chamber does not inject fuel in the equivalent SI mode of region IV. In the region III and the region IV, the engine adopts III and IV valve lift curves shown in FIG. 4, and the load of the engine is mainly controlled by the injection quantity of the main combustion chamber and the closing time of the intake valve. The equivalent ratio of the main combustion chamber is determined by the injection quantity of the pre-combustion chamber, and the air quality actually entering the cylinder is determined by the closing time of the intake valve. The load control of an SI engine without a throttle valve can be realized by the cooperation of the injection quantity of the main combustion chamber and the closing time of the intake valve. In-cylinder combustion cylinder pressure at medium-high load is shown by a solid line in FIG. 5, wherein the combustion pressure is slightly lower than that in the SACI mode, and the combustion phase is further retarded, so that knockings at full load conditions are avoided.

For vehicles operating in urban conditions for a long time, most of the operating conditions are in region II of FIG. 3. The SACI combustion mode of the area combines the stability of the SI mode and the high efficiency of the HCCI mode, and the advantages of energy conservation and emission reduction of the disclosure can be fully exerted. According to the disclosure, a smooth transition between different combustion modes can be realized instead of direct switching. The disclosure ensures that the engine has the optimal thermal efficiency in different working condition regions as much as possible.

The disclosure is not limited to the embodiments described above. The above description of specific embodiments is intended to describe and explain the technical aspects of the present disclosure, and the above specific embodiments are merely illustrative and not restrictive. Without departing from the spirit of the present disclosure and the scope of the claims, a person of ordinary skill in the art can make many specific transformations under the inspiration of the present disclosure, which all fall within the protection scope of the present disclosure.

What is claimed is:

1. An efficient engine combustion system with multiple combustion modes, comprising:

a pre-combustion chamber and a main combustion chamber arranged in an engine, wherein first and second injectors are mounted on a cylinder head of the engine, the first injector is mounted in the pre-combustion chamber and configured to provide mixed gas with equivalent ratio for the pre-combustion chamber, and the second injector is mounted in the main combustion chamber or on an intake port according to different engine structures, and configured to provide mixed gas for the main combustion chamber, a valve actuating mechanism, wherein the valve actuating mechanism is a fully variable valve mechanism, and wherein an intake valve and an exhaust valve of the valve actuating mechanism are arranged on the cylinder head of the engine and are driven by high-pressure oil to provide continuous variable of valve timing and real-time adjustment of valve lift in a range of 0-10 millimeters (mm);

an ignition apparatus for the pre-combustion chamber configured to provide ignition;

a spark plug and a single-hole fuel injector installed in the pre-combustion chamber; and a flame jet hole is arranged in a bottom end of the pre-combustion chamber;

wherein the system is configured to employ, for start-up, idle and low load operating conditions an equivalent spark ignition (SI) combustion mode in which the single-hole fuel injector installed in the pre-combustion chamber does not inject fuel, wherein the system is configured to employ, for partial load operating conditions, a lean-burn spark-assisted compression ignition (SACI) combustion mode, in which the single-hole fuel injector in the pre-combustion chamber injects fuel during an upward movement of a piston to realize stoichiometric combustion in the pre-combustion chamber, wherein the system is configured to employ, for medium and high load operating conditions, a lean-burn SI mode in which the single-hole fuel injector in the pre-combustion chamber injects fuel during the upward movement of the piston;

wherein the system is configured to employ, for full load operating conditions, the equivalent SI mode in which the single-hole fuel injector in the pre-combustion chamber does not inject fuel, wherein the intake valve and the exhaust valve are respectively connected with an intake port and an exhaust port, wherein an intake valve spring and an exhaust valve spring are respectively arranged on the intake valve and the exhaust valve, and each of the intake valve spring and the exhaust valve spring is connected with a respective hydraulic piston with an ejector rod, wherein opening and closing of the intake valve and the exhaust valve are performed by the respective hydraulic pistons, wherein each hydraulic piston is arranged in a respective one of two hydraulic cylinders, and a displacement sensor is arranged on each hydraulic cylinder and configured to measure valve lift, wherein an upper oil inlet pipe and a lower oil inlet pipe are both arranged on each hydraulic cylinder, and a one-way throttle valve is arranged on each of the upper oil inlet pipe and the lower oil inlet pipe, so that hydraulic oil is throttled in a forward direction and normally communicated in a reverse direction in pipes of the upper oil inlet pipe and the lower oil inlet pipe, and wherein the one-way throttle valve is connected with two holes of a three-position four-way servo valve, and other two holes of the three-position four-way servo valve are respectively connected with a high-pressure liquid source and a low-pressure liquid source through pipes.

2. The efficient engine combustion system with multiple combustion modes according to claim 1, wherein the high-pressure liquid source has a pressure in a range of 0-7 MPa and the low-pressure liquid source has a pressure of 1 bar.

3. The efficient engine combustion system with multiple combustion modes according to claim 1, wherein the spark plug and the single-hole fuel injector are both installed in a pre-combustion chamber housing, and an electrode of the spark plug, a bottom end of the single-hole fuel injector and an internal cavity of the pre-combustion chamber housing form the pre-combustion chamber; and the pre-combustion chamber housing is installed on the engine cylinder head by threads.

4. The efficient engine combustion system with multiple combustion modes according to claim 1, wherein an injection hole of the single-hole fuel injector is obliquely arranged so as to reduce wall impingement of a fuel spray injected in the pre-combustion chamber.

5. The efficient engine combustion system with multiple combustion modes according to claim 1, wherein the pre-combustion chamber is in communication with the main combustion chamber through jet holes, wherein a number of the jet holes is six, seven, or eight, wherein an aperture of the jet holes is in a range of 1-2 millimeters (mm), and wherein the jet holes are configured to enable flame to be jetted from the pre-combustion chamber to the main combustion chamber so as to improve a combustion rate in the main combustion chamber.

6. The efficient engine combustion system with multiple combustion modes according to claim 3, wherein an injection hole of the single-hole fuel injector is obliquely arranged so as to reduce wall impingement of a fuel spray injected in the pre-combustion chamber.

7. The efficient engine combustion system with multiple combustion modes according to claim 3, wherein the pre-combustion chamber is in communication with the main combustion chamber through jet holes, wherein a number of the jet holes is six, seven, or eight, and an aperture of the jet holes is in a range of 1-2 millimeters (mm); and wherein the jet holes are configured to enable flame to be jetted from the pre-combustion chamber to the main combustion chamber so as to improve a combustion rate in the main combustion chamber.

* * * * *

UNITED STATES PATENT AND TRADEMARK OFFICE
CERTIFICATE OF CORRECTION

| | |
|---|---|
| PATENT NO. | : 11,143,091 B2 |
| APPLICATION NO. | : 16/967037 |
| DATED | : October 12, 2021 |
| INVENTOR(S) | : Wei et al. |

It is certified that error appears in the above-identified patent and that said Letters Patent is hereby corrected as shown below:

In the Specification

Column 7, Line 15: Please correct "mixed as" to read -- mixed gas --

Signed and Sealed this
Eighth Day of March, 2022

Drew Hirshfeld
*Performing the Functions and Duties of the
Under Secretary of Commerce for Intellectual Property and
Director of the United States Patent and Trademark Office*